(12) United States Patent
Williams

(10) Patent No.: US 9,714,677 B2
(45) Date of Patent: Jul. 25, 2017

(54) COATED CONNECTING ROD AND METHOD OF MAKING THE SAME

(71) Applicant: Ford Global Technologies, LLC, Dearborn, MI (US)

(72) Inventor: Rick L. Williams, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 14/163,402

(22) Filed: Jan. 24, 2014

(65) Prior Publication Data

US 2015/0211570 A1 Jul. 30, 2015

(51) Int. Cl.

| F02B 75/32 | (2006.01) |
|---|---|
| F16C 7/02 | (2006.01) |
| F16J 1/01 | (2006.01) |
| F16C 9/04 | (2006.01) |
| F16C 33/04 | (2006.01) |
| F16J 7/00 | (2006.01) |
| F16J 1/14 | (2006.01) |
| F02B 75/02 | (2006.01) |
| F16C 17/04 | (2006.01) |

(52) U.S. Cl.
CPC ............ *F16C 7/023* (2013.01); *F16C 9/04* (2013.01); *F16C 33/043* (2013.01); *F16J 1/01* (2013.01); *F16J 7/00* (2013.01); *F02B 75/32* (2013.01); *F02B 2075/025* (2013.01); *F16C 17/04* (2013.01); *F16C 2223/60* (2013.01); *F16C 2360/22* (2013.01); *F16J 1/14* (2013.01); *Y10T 74/2162* (2015.01)

(58) Field of Classification Search
CPC .. F16C 7/023; F16C 9/04; F02B 75/32; F02B 2075/025; F16J 1/14
USPC .......................................... 123/197.3
See application file for complete search history.

(56) References Cited

U.S. PATENT DOCUMENTS

| 4,873,951 A * | 10/1989 | Garthwaite ............... 123/197 |
|---|---|---|
| 8,893,580 B2 * | 11/2014 | Domanchuk et al. ....... 74/579 E |
| 2004/0261752 A1 * | 12/2004 | Rein ..................... B22F 7/06 123/197.4 |
| 2008/0163751 A1 | 7/2008 | Subramanian et al. |
| 2009/0078080 A1 * | 3/2009 | Kemnitz et al. ........... 74/579 E |
| 2010/0050432 A1 * | 3/2010 | Guerreiro ................ 29/888.09 |

(Continued)

FOREIGN PATENT DOCUMENTS

DE 102010010642 * 9/2011 .............. F16C 9/045

OTHER PUBLICATIONS

Wayne Ward, Rod thrust face design, High Power Media (www.highpower.media.com/blog, Jul. 3, 2012, 9 pages including commentaries by others.

(Continued)

*Primary Examiner* — Hung Q Nguyen
*Assistant Examiner* — Charles Brauch
(74) *Attorney, Agent, or Firm* — LeClairRyan

(57) ABSTRACT

In one or more embodiments, a coated connecting rod includes a first head including a first aperture, a second head including a second aperture, and a body connecting the first and second heads along a longitudinal axis, wherein the first head further includes face and back thrust surfaces abutting the first aperture and an anti-friction coating partially contacting at least one of the face and back thrust surfaces.

20 Claims, 6 Drawing Sheets

(56) References Cited

U.S. PATENT DOCUMENTS

2013/0220115 A1    8/2013  Kantola et al.

OTHER PUBLICATIONS

Wayne Ward, DLC coating, High Power Media (www.highpowermedia.com/blog), Feb. 9, 2012, 9 pages including commentaries by others.

* cited by examiner

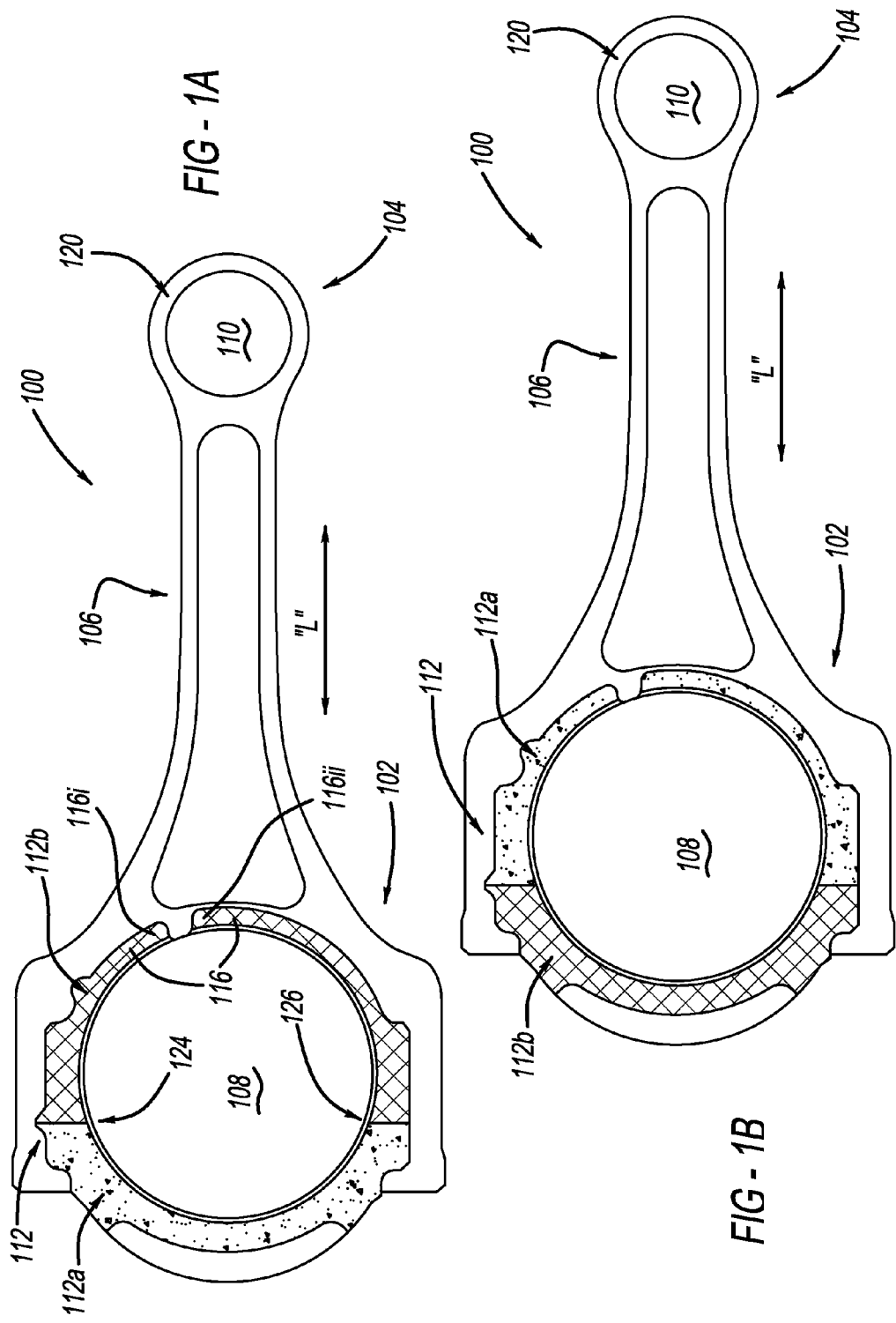

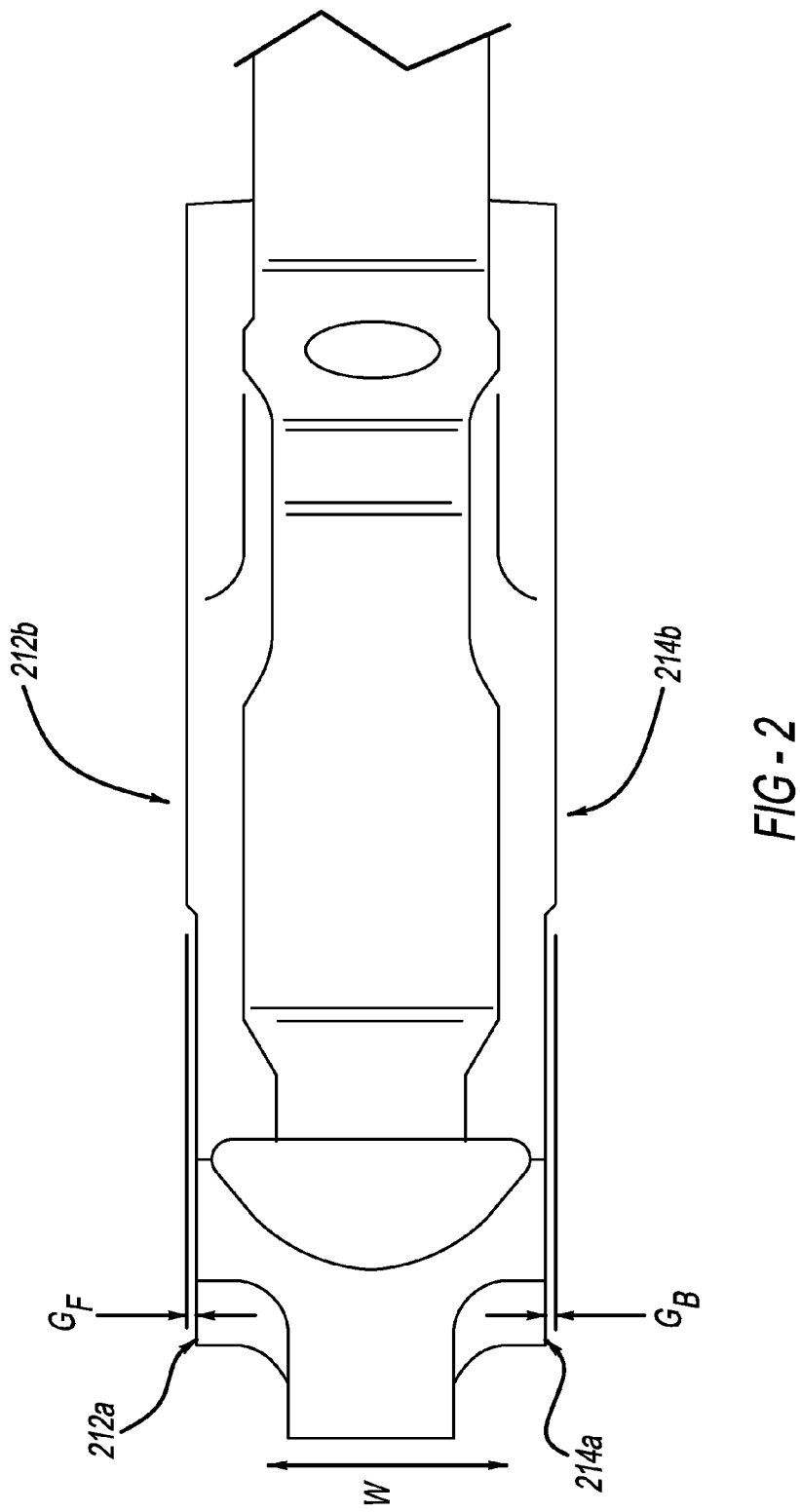

COATED CONNECTING ROD AND METHOD OF MAKING THE SAME

TECHNICAL FIELD

The disclosed inventive concept relates generally to coated connecting rods and to a method of making the same.

BACKGROUND

A connecting rod or a "con-rod" may be used to connect a piston to a crankshaft in an engine environment, whereby rotating motions may be converted to reciprocating motions. As a part of power conversion components family, any surface wear on the connecting rod can be translated to added mechanical friction which may result in fuel economy reduction.

It would thus be advantageous if connecting rods may be produced to have relatively greater resistance against surface wear and mechanical friction.

SUMMARY

In one or more embodiments, a coated connecting rod includes a first head including a first aperture, a second head including a second aperture, and a body connecting the first and second heads along a longitudinal axis, wherein the first head further includes face and back thrust surfaces abutting the first aperture, and an anti-friction coating partially contacting at least one of the face and back thrust surfaces.

The face (back) thrust surface may include a coated face (back) portion and a non-coated face (back) portion. The coated face (back) portion may be positioned between the non-coated face (back) portion and second head along the longitudinal axis. Alternatively, the non-coated face (back) portion may be positioned between the coated face (back) portion and the second head along the longitudinal axis. Further alternatively, the coated face (back) portion may include a first number of coated face (back) regions, and the non-coated face (back) portion may include a second number of non-coated face (back) regions, the first number of coated face (back) regions being spaced apart from each other by the second number of non-coated face (back) regions.

In these designs, there may be a face (back) surface gap between the coated and non-coated face (back) portions along a thickness dimension "W".

The second head may include a second face surface and a second back surface abutting the second aperture, and an anti-friction coating at least partially contacting at least one of the second face surface and the second back surface.

In another or more embodiments, an engine assembly is provided to include a connecting rod described herein elsewhere and connected to a piston and a crankshaft.

In yet another or more embodiments, a method is provided to coat a connecting rod to form a coated connecting rod described herein elsewhere, the method including applying an anti-friction coating onto a portion of at least one of the first face and back surfaces abutting the first aperture.

The method may further include creating an undercut of another portion of at least one of the first face and back surfaces abutting the first aperture.

The step of creating the undercut may be completed no later than when the step of applying the anti-friction coating is completed. The step of creating the undercut may be completed prior to when the step of applying the anti-friction coating starts.

The method may further include applying an anti-friction coating to at least one of a second face surface and a second back surface of the second head abutting the second aperture.

The above advantages and other advantages and features will be readily apparent from the following detailed description of embodiments when taken in connection with the accompanying drawings.

BRIEF DESCRIPTION OF THE DRAWINGS

For a more complete understanding of embodiments of this invention, reference should now be made to the embodiments illustrated in greater detail in the accompanying drawings and described below by way of examples wherein:

FIG. 1A illustratively depicts a front view of a connecting rod according to one or more embodiments;

FIG. 1B illustratively depicts an alternative front view of the connecting rod referenced in FIG. 1A;

FIG. 2 illustratively depicts a top-down view of the connecting rod referenced in FIG. 1A or FIG. 1C;

DETAILED DESCRIPTION OF ONE OR MORE EMBODIMENTS

Figure 1C:
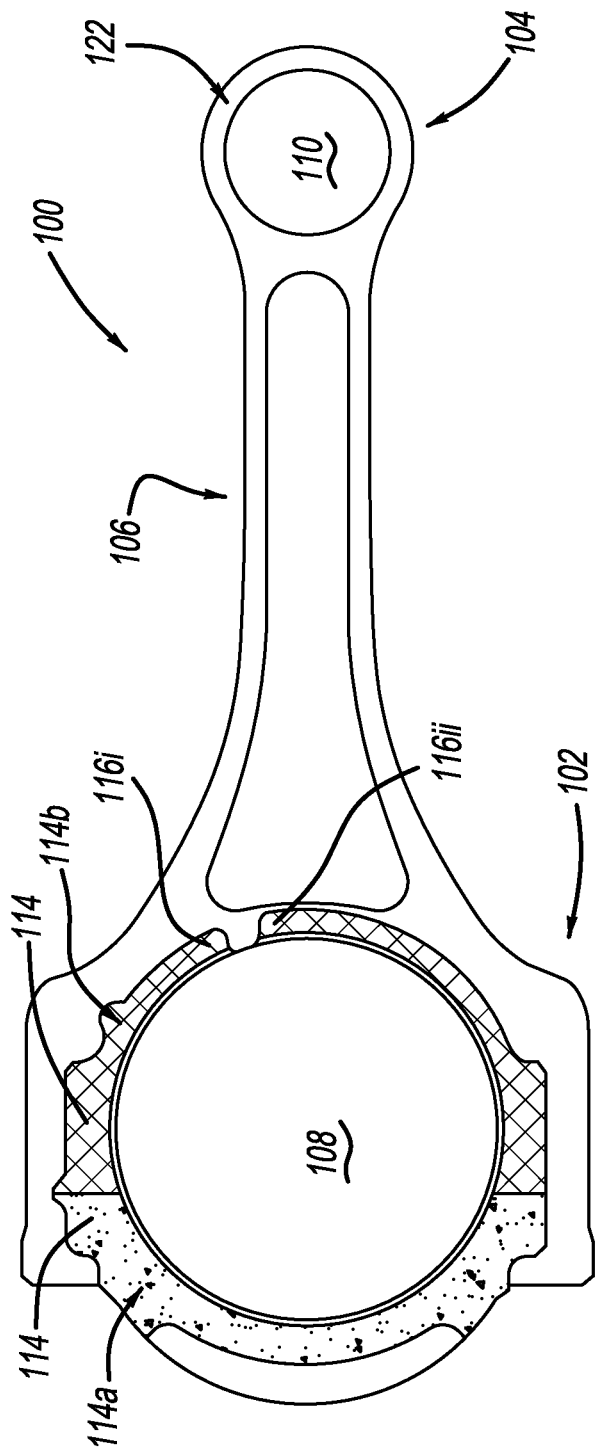
FIG. 1C illustratively depicts a back view of the connecting rod referenced in FIG. 1A, FIG. 1B or FIG. 1D.

As referenced in the figures, the same reference numerals are used to refer to the same components. In the following description, various operating parameters and components are described for different constructed embodiments. These specific parameters and components are included as examples and are not meant to be limiting.

The disclosed inventive concept is believed to have overcome one or more of the problems associated with connecting rods and engine assemblies employing the same.

As detailed herein elsewhere, the present invention in one or more embodiments is advantageous in at least providing a connecting rod with relatively greater resistance to surface wear and hence more extended lifespan. The connecting rod is provided with an anti-friction coating which contacts only a portion of the thrust surface(s) of the connecting rod. The partial coating provides the anti-friction effect while synergistically delivering an additional benefit in cost effectiveness, as full coating may not be needed. This benefit is further enhanced when the anti-friction coating involves materials and/or services that may be very costly. Moreover, when the anti-friction coating involves a material that may require a high temperature to apply, the high temperature may negate the benefits of certain surface treatments such as shot-peening the connecting rod may require. Therefore, by partially coating the connecting rod with an anti-friction coating material to the area and to the extent as needed, unnecessary material and labor cost, and unnecessary stress to the connecting rod imparted by the coating application itself may be reduced.

In one or more embodiments, and as illustratively depicted in FIG. 1A to 1D, FIG. 2 and FIG. 3, a coated connecting rod generally shown at 100 includes a first head 102 including a first aperture 108 for receiving a crankshaft 304, a second head 104 including a second aperture 110 for receiving a piston 302, and a body 106 connecting the first and second heads 102, 104 along a longitudinal axis "L", wherein the first head 102 further includes first face and back thrust surfaces 112, 114 abutting the first aperture 108, and an anti-friction coating 116 partially contacting at least one of the first face and back thrust surfaces 112, 114.

The face thrust surface 112 may include a coated face portion 112b and a non-coated face portion 112a separable by lines 124 and 126. The lines 124, 126 do not have to be straight and can be of any suitable shape such as a curved line and a line with turns or angles. The presence of the non-coated portion 112a demonstrates the inventive discovery according to the present invention that the anti-friction coating 116 does not have to cover the entire thrust surface such as the entire face thrust surface 112 depicted in FIG. 1A, FIG. 1B or FIG. 1D. The relative surface area ratio between the coated face portion 112b in comparison to the non-coated face portion 112a may be varied as needed.

The term "thrust surface" may refer to a protruding portion abutting an aperture such as the first aperture 108 or the second aperture 110, where the crankshaft 304 or the piston 302 may come in contact with the connecting rod 100.

Referring back to FIG. 1A and FIG. 1B, the coated face portion 112b may be positioned between the non-coated face portion 112a and the second head 104 along the longitudinal axis "L" as shown in FIG. 1A; alternatively, the non-coated face portion 112a may be positioned between the coated face portion 112b and the second head 104 along the longitudinal axis "L" as shown in FIG. 1B.

Figure 1D:
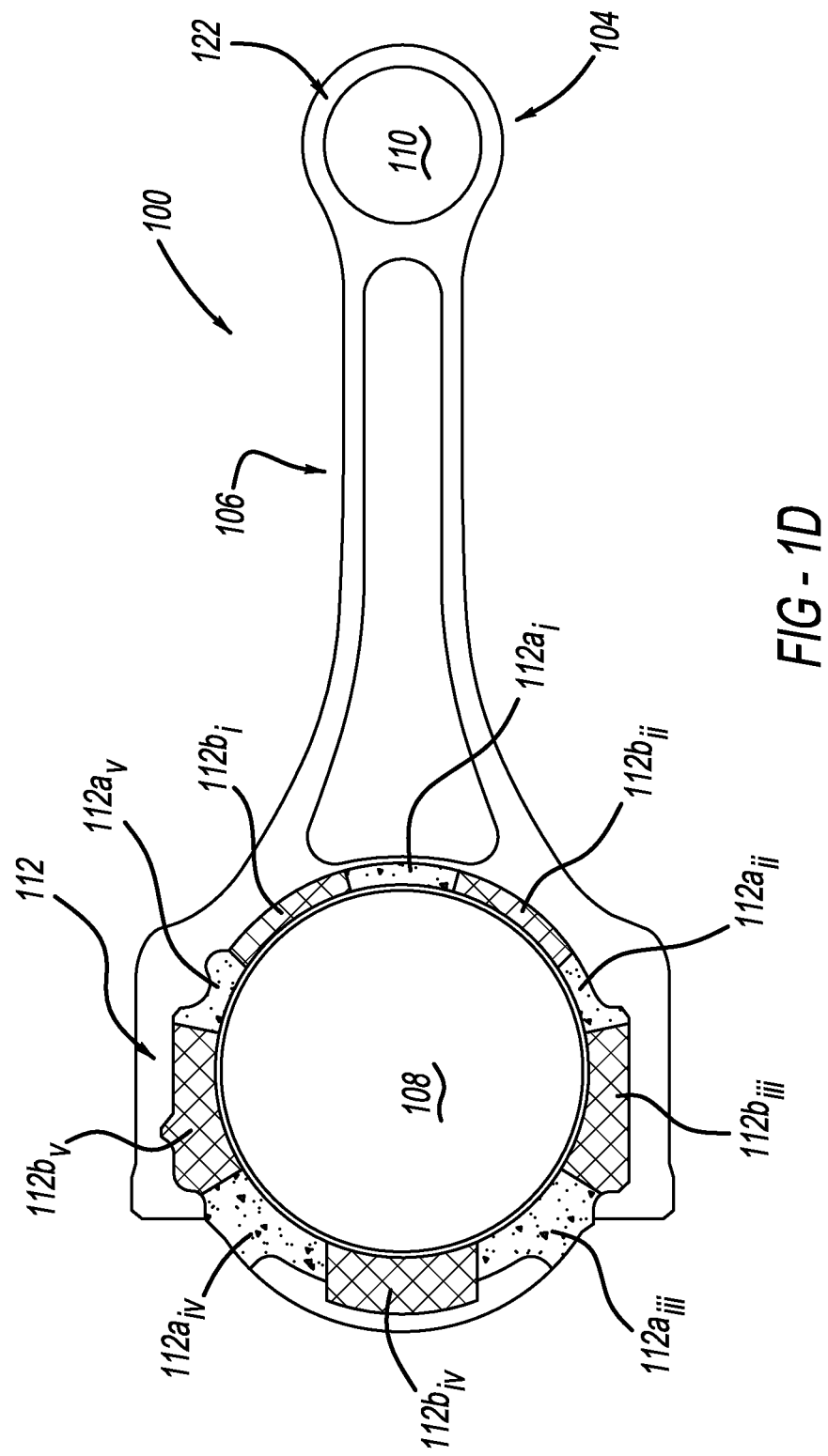
FIG. 1D illustratively depicts yet another alternative front view of the connecting rod referenced in FIG. 1A or FIG. 1B.

Further alternatively, and as illustratively depicted in FIG. 1D, the coated face portion 112b may include a number of coated sections 112bi, 112bii, 112biii, 112biv, and 112bv. Although only five separate sections are shown in FIG. 1D, the coated sections may vary in number and spacing between any two adjacent coated sections may vary in value as needed. The coated sections may be separated from each other by non-coated sections 112ai to 112av; the non-coated sections may be undercut so as to present a recessed portion relative to the coated counterparts 112bi to 112bv. Without wanting to be limited to any particular theory, it is believed that the presence of a recessed portion such as the uncoated portions 112a to 112av effectively reduces the extent of contact between the thrust surface of the connecting rod 100 and the crankshaft 304. The partial contact is strengthened via the use of a coating material such as the anti-friction coating 116.

In order to ensure that the partial contact delivered by the raised portions 112b or 112bi through 112bv still provide the strength needed for securing the connection with the crankshaft 304, a suitable portion ratio may be designed between the total area of the raised portions in comparison to the total area of the recessed portions of the face or back thrust surfaces. In general, the portion ratio may be from 25 percent to 75 percent, 35 percent to 65 percent, or 45 percent to 55 percent.

FIG. 1C illustratively depicts a back view of the coated connecting rod 100 referenced in FIG. 1A or FIG. 1B. The same reasoning and design for partial coating described herein in relation to FIG. 1A and/or FIG. 1B may be applied to the design of the back thrust surface 114 of the coated connecting rod 100 referenced in FIG. 1C. Therefore, the back thrust surface 114 may similarly include a coated back portion 114b and a non-coated back portion 114a, with the relative portion ratio between the two being variable as needed. The anti-friction coating 116 as applied onto the coated face portion 112b and the coated back portion 114b may be the same or different in composition, coating thickness and/or coverage area. Similarly also, the back thrust surface 114 may adopt the design depicted in FIG. 1D to have a number of coated regions separated by a number of non-coated regions.

Referring back to FIG. 1A or FIG. 1C in view of FIG. 2, at least a portion of the non-coated face portion 112a (not contacted with the anti-friction coating 116) is undercut such that there is a non-zero face surface gap "$G_F$" defining a difference between a surface 212b of the coated face portion 112b and a surface 212a of the non-coated face portion 112a. In certain instances, the face surface gap "$G_F$" may be of a value greater than a thickness of the anti-friction coating 116. Therefore the face surface gap "$G_F$" may exist prior to the application of the anti-friction coating 116. In certain instances, the face surface gap "$G_F$" is a value of 0.1 to 0.6 millimeters, 0.15 to 0.55 millimeters, 0.20 to 0.50 millimeters, 0.25 to 0.45 millimeters, or 0.30 to 0.40 millimeters. The value of $G_F$ may be varied according to a given design; however, a suitable range for the value of $G_F$ may be defined such that design space for the width of the bearing and hence the strength of the bearing is not unnecessarily compromised.

Similarly, at least a portion of the non-coated back portion 114a (not contacted with the anti-friction coating 116) may also be undercut such that there is a non-zero back surface gap "$G_B$" defining a difference between a surface 214b of the coated back portion 114b and a surface 214a of the non-coated back portion 114a. In certain instances, the back surface gap "$G_B$" may be of a value greater than a thickness of the anti-friction coating 116. Therefore the back surface gap "$G_B$" may exist prior to the application the anti-friction coating 116. In certain instances, the face surface gap "$G_B$" is a value of 0.1 to 0.6 millimeters, 0.15 to 0.55 millimeters, 0.20 to 0.50 millimeters, 0.25 to 0.45 millimeters, or 0.30 to 0.40 millimeters. Like the value of $G_F$, the value of $G_B$ may be varied according to a given design; however, a suitable range for the value of $G_B$ may be defined such that design space for the width of the bearing and hence the strength of the bearing is not unnecessarily compromised.

In certain instances, and as depicted in FIG. 1A and/or FIG. 1C, the anti-friction coating 116 may be configured to have two or more spaced apart sections 116i, 116ii. Although two sections 116i, 116ii are shown in FIG. 1A and FIG. 1C, the total number of the sections may be varied as needed. For instance, and as illustratively depicted in FIG. 1D, the anti-friction coating 116 may be present on each of the coated sections 112bi through 112bv.

In certain instances, the second head 104 may include a second face surface 120 and a second back surface 122 abutting the second aperture 110, and an anti-friction coating 116 at least partially contacting the second face surface 120, the second back surface 122, or both.

Figure 3:
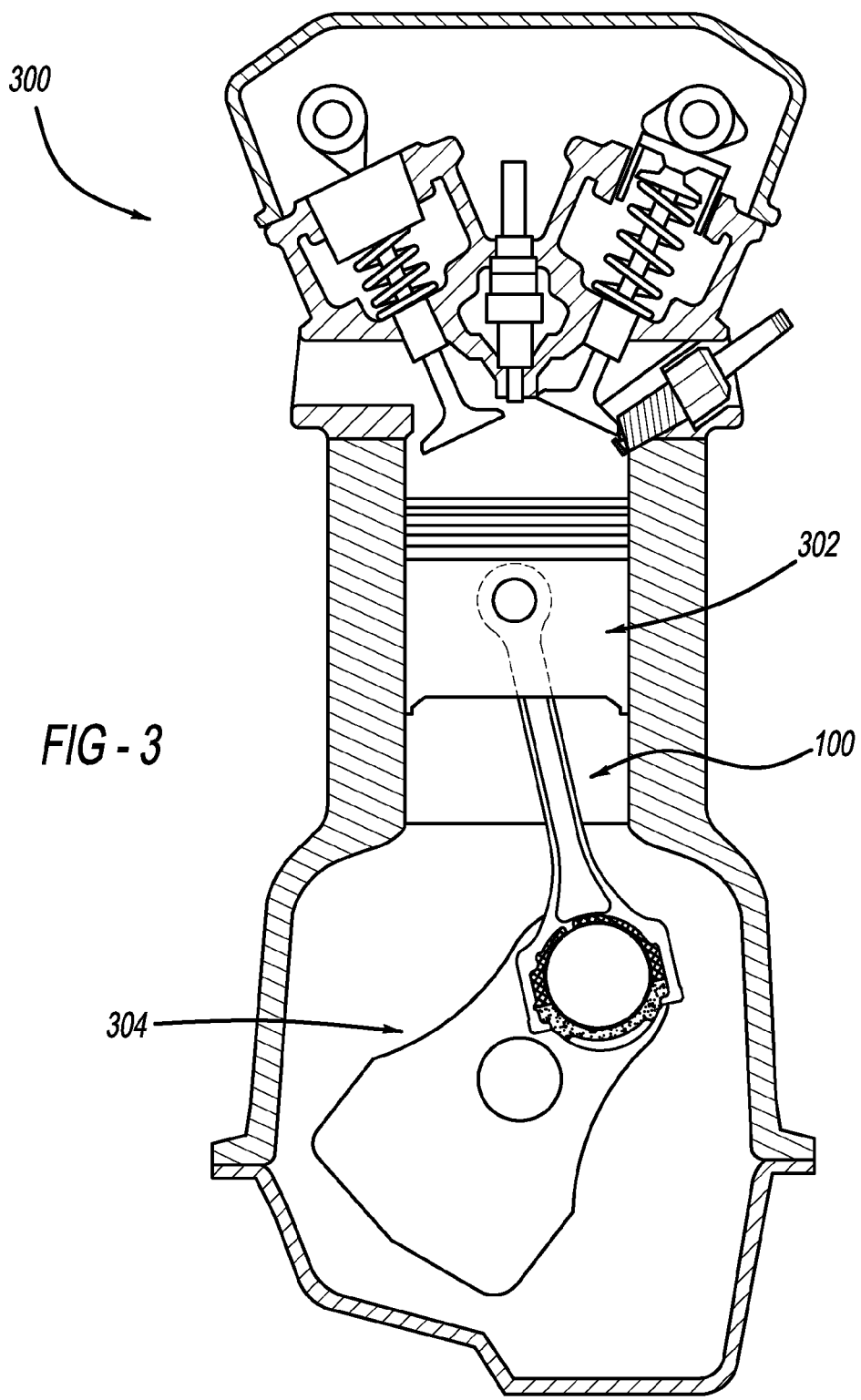
FIG. 3 illustratively depicts a partial, perspective view of an engine assembly employing the connecting rod referenced in any one of FIG. 1A to FIG. 1D.

In another or more embodiments, and as illustratively depicted in FIG. 3, an engine assembly generally shown at 300 includes the coated connecting rod 100 described herein, and the piston 302 and the crankshaft 304 connected to the coated connecting rod 100.

Figure 4:
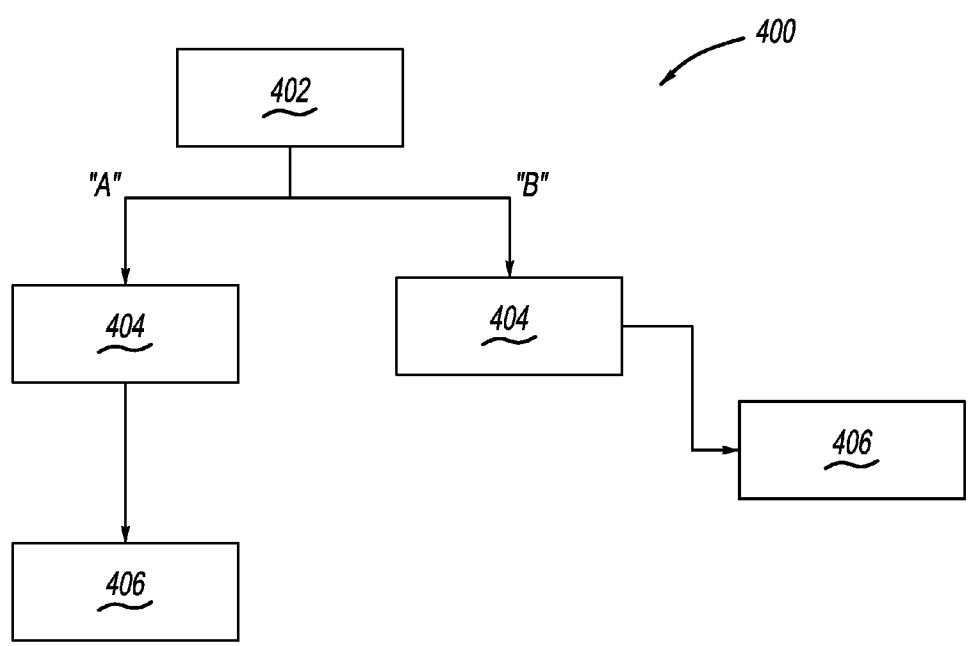
FIG. 4 illustratively depicts a non-limiting method for forming the coated connecting rod referenced in FIG. 1A to FIG. 1C.

In yet another or more embodiments, and as illustratively depicted in FIG. 4, a method generally shown at 400 is provided to coat a connecting rod to form a coated connecting rod such as the coated connecting rod 100 described herein elsewhere, the method including applying an anti-friction coating onto a portion of at least one of the first face and back surfaces abutting the first aperture.

Referring back to FIG. 4, the method 400 includes, at step 402, providing a connecting rod as a starting tool. At step 404, creating undercuts or recessed portions such as areas 112*a*, 112*ai*, 112*aii*, 112*aiii*, 112*aiv* and 112*av* referenced herein elsewhere. At step 406, an anti-friction coating material is applied to the remaining areas of the thrust surfaces. The remaining areas are what may be left on the thrust surfaces that have not been subjected to the undercut, and therefore are areas of raised portions relative to the undercut portions.

Referring back to FIG. 4, subsequent to the step 402, the method 400 may be varied, for instance, between route "A" and route "B." According to route "B," the step of creating the undercut referenced at step 404 may be completed no later than when the step of applying the anti-friction coating at step 406 is completed. According to route "A," the step of creating the undercut referenced at step 404 may be completed prior to when the step 406 of applying the anti-friction coating starts.

The coated connecting rod 100 excluding the anti-friction coating 116 may be made of any suitable material. Non-limiting examples of the suitable material include steel and/or titanium.

The anti-friction coating 116 may be of any suitable anti-friction compositions, including certain inorganic polymers such as iron oxides, and carbon containing materials such as diamond-like-carbon (DLC) coating materials.

In particular, DLC coatings may exhibit certain desirably low coefficient of friction and high micro-hardness, making them effective in many wear applications. DLC coatings are generally formed when ionized and decomposed carbon or hydrocarbon species land on the surface of a substrate with energy. DLC film properties may be controlled by adjusting flux characteristics of certain deposition technique such as PVD sputter or evaporation and Pa-CVD.

The anti-friction coating 116 may include a very low metal content, for instance, has a metal content of less than 20 weight percent, 15 weight percent, 10 weight percent, or 5 weight percent. The anti-friction coating includes less than 20 weight percent of chromium or CrN.

In one or more embodiments, the disclosed invention as set forth herein overcomes one or more challenges associated with surface wear of the connecting rods and engine assemblies. However, one skilled in the art will readily recognize from such discussion, and from the accompanying drawings and claims that various changes, modifications and variations can be made therein without departing from the true spirit and fair scope of the invention as defined by the following claims.

What is claimed is:

1. A coated connecting-rod comprising
a first head including a first aperture;
a second head including a second aperture; and
a body connecting the first and second heads along a longitudinal axis, wherein the first head further includes a first face thrust surface and a first back thrust surface abutting the first aperture, and an anti-friction coating partially contacting a first area of the first face thrust surface, the first face thrust surface and the first back thrust surface each being a protruding portion abutting the first aperture, wherein the first area of the first face thrust surface includes a coated face portion having a coated face width extending outward from said first aperture, said coated face width being irregular and a non-coated face portion having a non-coated face width extending from said first aperture, said non-coated face width being irregular, at least one of said coated face or said non-coated face being separated into two spaced apart portions.

2. The coated connecting-rod of claim 1, wherein the first back thrust surface includes a coated back portion and a non-coated back portion, the coated back portion being positioned between the non-coated back portion and the second head along the longitudinal axis.

3. The coated connecting-rod of claim 1, wherein the first back thrust surface includes a coated back portion and a non-coated back portion, the non-coated back portion being positioned between the coated back portion and the second head along the longitudinal axis.

4. The coated connecting-rod of claim 1, wherein the first back thrust surface includes a coated back portion including a first number of coated back regions and a non-coated back portion including a second number of non-coated back regions, the first number of coated back regions being spaced apart from each other by the second number of non-coated back regions.

5. The coated connecting-rod of claim 1, wherein the coated face portion and the non-coated face portion are with a face portion ratio between the two, and the first back thrust surface includes a coated back portion and a non-coated back portion with a back portion ratio between the two, and wherein at least one of the face and back portion ratios is 25 to 75 percent in value.

6. The coated connecting-rod of claim 1, wherein the second head includes a second face surface and a second back surface abutting the second aperture, and a second anti-friction coating at least partially contacting at least one of the second face surface and the second back surface.

7. A method of coating a connecting-rod to form a coated connecting-rod, the connecting-rod having a long axis and including a first head including a first aperture for receiving a crankshaft, a second head including a second aperture for receiving a piston, and a body connecting the first and second heads along a longitudinal axis, the first head further including first face thrust surface and first back thrust surface abutting the first aperture, the first face thrust surface and the first back thrust surface each being a protruding portion abutting the first aperture, the method comprising:
applying an anti-friction coating onto a first area of the first face thrust surface to form a coated face portion and a non-coated face portion, said coated face portion having a coated face width extending outward from said first aperture, said coated face width being irregular and a non-coated face portion having a non-coated face width extending from said first aperture, said non-coated face width being irregular, at least one of said coated face or said non-coated face having opposed portions formed perpendicularly to said long axis of said connecting rod, said opposed portions including generally linear outer edges; and
creating an undercut on a second area of the first face thrust surface, the second area being separate and spaced apart from the first area.

8. The method of claim 7, wherein the step of creating the undercut is completed no later than when the step of applying the anti-friction coating is completed.

9. The method of claim 7, wherein the step of creating the undercut is completed prior to when the step of applying the anti-friction coating starts.

10. The method of claim 7, further comprising applying another anti-friction coating to at least one of a second face surface and a second back surface of the second head abutting the second aperture.

11. The coated connecting-rod of claim 1, wherein the coated face portion includes first, second and third coated face regions, the non-coated face portion includes first and second non-coated face regions, the first non-coated face region being positioned between the first and second coated face regions, and the second non-coated face region being positioned between the second and third coated face regions.

12. The coated connecting-rod of claim 1, wherein the coated face portion includes first and second coated face regions, the non-coated face portion includes first, second and third non-coated face regions, the first coated face region being positioned between the first and second non-coated face regions, and the second coated face region being positioned between the second and third non-coated face regions.

13. The method of claim 7, wherein the coated face portion is formed to include first and second coated face regions, the non-coated face portion is formed to include first, second and third non-coated face regions, the first coated face region being positioned between the first and second non-coated face regions, and the second coated face region being positioned between the second and third non-coated face regions.

14. The method of claim 7, wherein the coated face portion is formed to include first, second and third coated face regions, the non-coated face portion is formed to include first and second non-coated face regions, the first non-coated face region being positioned between the first and second coated face regions, and the second non-coated face region being positioned between the second and third coated face regions.

15. A coated connecting-rod comprising:
a first head including a first aperture;
a second head including a second aperture; and
a body connecting the first and second heads along a longitudinal axis, wherein the first head further includes a first face thrust surface and a first back thrust surface abutting the first aperture, and an anti-friction coating partially contacting a first area of the first face thrust surface, the first face thrust surface and the first back thrust surface each being a protruding portion abutting the first aperture, wherein the first area of the first face thrust surface includes a coated face portion and a non-coated face portion, the coated face portion being positioned between the non-coated face portion and the second head along the longitudinal axis, and wherein a second area of the first face thrust surface defines thereupon an undercut and being separate and spaced apart from the first area, a face surface gap defined between the undercut of the second area and the coated faced portion of the first area being greater than a thickness of the anti-friction coating along a thickness direction, said coated face portion having a coated face width extending outward from said first aperture, said coated face width being irregular and said non-coated face portion having a non-coated face width extending from said first aperture, said non-coated face width being irregular.

16. The coated connecting-rod of claim 15, wherein the second head includes a second face surface and a second back surface abutting the second aperture, and a second anti-friction coating at least partially contacting at least one of the second face surface and the second back surface.

17. The coated connecting-rod of claim 1, wherein the first area is positioned between the second head and the second area along the longitudinal axis of the body.

18. The method of claim 7, wherein the first face thrust surface is provided such that the first area is positioned between the second head and the second area along the longitudinal axis of the body.

19. The coated connecting-rod of claim 7, wherein a face surface gap defined between the undercut of the second area and the coated faced portion of the first area is greater than a thickness of the anti-friction coating along a thickness direction.

20. The coated connecting-rod of claim 15, wherein the first area is positioned between the second head and the second area along the longitudinal axis of the body.

* * * * *